(12) United States Patent
Loftus et al.

(10) Patent No.: US 9,114,716 B2
(45) Date of Patent: Aug. 25, 2015

(54) METHOD AND APPARATUS FOR HIGH-VOLTAGE DC CHARGING OF BATTERY-ELECTRIC AND PLUG-IN HYBRID ELECTRIC VEHICLES

(71) Applicants: Michael Edward Loftus, Northville, MI (US); John Proietty, Ferndale, MI (US); Fazal Urrahman Syed, Canton, MI (US); Ben A. Tabatowski-Bush, South Lyon, MI (US); Perry Robinson MacNeille, Lathrup Village, MI (US)

(72) Inventors: Michael Edward Loftus, Northville, MI (US); John Proietty, Ferndale, MI (US); Fazal Urrahman Syed, Canton, MI (US); Ben A. Tabatowski-Bush, South Lyon, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 13/732,998

(22) Filed: Jan. 2, 2013

(65) Prior Publication Data

US 2014/0184141 A1 Jul. 3, 2014

(51) Int. Cl.
*H02J 7/00* (2006.01)
*H02J 7/14* (2006.01)
*B60L 11/18* (2006.01)

(52) U.S. Cl.
CPC .......... *B60L 11/1818* (2013.01); *Y02T 10/7005* (2013.01); *Y02T 10/7088* (2013.01); *Y02T 10/7216* (2013.01); *Y02T 10/92* (2013.01); *Y02T 90/14* (2013.01); *Y02T 90/16* (2013.01); *Y02T 90/163* (2013.01)

(58) Field of Classification Search
CPC ............ B06L 11/1809; B06L 11/1816; B06L 2210/12; B06L 2210/14; B06L 2210/30; B06L 11/1818; Y02T 10/7005; Y02T 10/7088; Y02T 10/7225; Y02T 10/7233; Y02T 10/7241; Y02T 90/121; Y02T 90/127; Y02T 90/14; Y02T 90/16
USPC .......................................... 320/104, 105, 109
See application file for complete search history.

(56) References Cited

U.S. PATENT DOCUMENTS

| 5,283,513 A | 2/1994 | Fujita |
| 5,677,614 A | 10/1997 | Ohmori |

(Continued)

OTHER PUBLICATIONS

Hank Mcglynn: A Perspective on Reverse Flow; http://documents.aeych.com/ReverseFlow_AEYCH.pdf; AEYCH LLC (Jun. 2011).

(Continued)

*Primary Examiner* — Vuthe Siek
(74) *Attorney, Agent, or Firm* — Maristyn Law LLC; Lynda F. Kouroupis; David B. Kelley

(57) ABSTRACT

A portable charging device can provide controllable fast DC charging of an electric vehicle (EV) high voltage battery by a separate EV high voltage battery. The charging device can be configured to comply with universal standards for EV charging so as to be compatible with various automobile models of various manufacturers. The device can be configured to establish a communication link with a donor and recipient vehicle and conduct a voltage matching process between the batteries of the two vehicles prior to transferring power to the recipient vehicle battery. To prevent energy theft, control of a charging process can be shared among the charging device and the donor and receiver vehicles. A charger device can be configured to enable a charging process only when no faults are detected. A charger device can allow a motorist to quickly recharge a depleted high voltage battery at a convenient time and location.

20 Claims, 6 Drawing Sheets

(56) References Cited

U.S. PATENT DOCUMENTS

| | | | |
|---|---|---|---|
| 2007/0152502 A1* | 7/2007 | Kinsey et al. | 307/10.1 |
| 2008/0192513 A1* | 8/2008 | Kusubayashi | 363/21.01 |
| 2011/0202217 A1 | 8/2011 | Kempton | |
| 2011/0202418 A1* | 8/2011 | Kempton et al. | 705/26.1 |
| 2012/0249065 A1* | 10/2012 | Bissonette et al. | 320/109 |
| 2014/0121866 A1* | 5/2014 | Dangler et al. | 701/22 |

OTHER PUBLICATIONS

Delphi Portable Electric Vehicle Charger, http://delphi.com/shared/pdf/ppd/pwerelec/portable-ev-charger.pdf; www.delphi.com.

* cited by examiner

METHOD AND APPARATUS FOR HIGH-VOLTAGE DC CHARGING OF BATTERY-ELECTRIC AND PLUG-IN HYBRID ELECTRIC VEHICLES

BACKGROUND OF INVENTION

1. Field of Art

This invention relates generally to charging of electrified vehicles, and more particularly to portable DC charging devices.

2. Background Art

In conventional and hybrid electric automobiles, an internal combustion engine can provide motoring power, and a low voltage battery can provide power for devices such as a starter motor, a cabin ventilation system, internal and external lights, an entertainment system and the like. In general, with a gasoline-powered engine a vehicle with full fuel reservoir can drive around 300 or more miles. When the fuel supply for the engine is depleted, it can be replenished with a brief stop at a service station. In desperate circumstances, when a vehicle is stranded without fuel in a remote area, a simple hose can be used to siphon gasoline from the fuel tank of an accommodating passing motorist who stops to assist. Similarly, when the charge of a conventional low voltage automobile battery drops below a required minimum, rendering a vehicle inoperable, the battery voltage can usually be boosted without too much difficulty or delay. For example, a set of inexpensive jumper cables, easily stowed at the vehicle, can electrically connect terminals of a functional battery to those of a depleted battery to complete a charging circuit that can reenergize the dead battery.

While a majority of automobiles continue to employ a gasoline engine, a quest to reduce emissions and increase exploitation of renewable energy drives an expanding market for electrically powered automobiles. Fully electrified vehicles that rely on a high voltage battery for motoring power have a driving range of around 100-200 miles per full charge. A high voltage battery is typically recharged by connection with an alternating current (AC) power grid. In most cases, a high voltage battery is coupled to the grid over an extended period during which there is no demand for the vehicle, such as during working hours, overnight at home, or during a prolonged parking period at a public charging station, such as at an airport while an operator is on travel.

For long-range travel, an operator can often plan a route and itinerary to include stops of sufficient duration at known recharging site locations. Should a battery unexpectedly run low during a motoring excursion, due, for example, to unexpected headwinds or other environmental factors that increase the amount of energy required for motoring, it is possible to recharge it at a charging station en route so that an operator can continue driving to his intended destination. One potential problem with such a scenario, however, is that charging stations for electrified vehicles are generally not as ubiquitous or conveniently located as conventional gasoline stations. Consequently, the likelihood of encountering one when a battery charge unexpectedly runs low is much less than that of happening upon a conventional service station.

Most charging stations provide lower power Level 1 or Level 2 charging by a process that can take up to several hours to charge a depleted battery. While long charging times can be acceptable when charge transfer is performed at predetermined times and locations, an extended recharging period can adversely affect travel plans when the process must be conducted unexpectedly. Concern regarding the possibility that a battery will become depleted while driving can discourage consumers from purchasing or employing electrified vehicles, depriving them personally, and the society at large, of the many benefits that an electric vehicle can offer.

SUMMARY OF INVENTION

The present invention provides methods and apparatus for high voltage charging of electrified vehicles. An example system can include a donor high voltage energy storage device (ESD) at a donor electric vehicle, a receiving high voltage energy storage device (ESD) at a recipient vehicle, and a portable cross electric vehicle charger (PxEVC) configured to controllably transfer energy from said donor ESD to said receiving ESD. In an example embodiment, a system can be configured for fast DC charging of the receiving ESD by the donor ESD.

A charging apparatus can include a first connector configured for coupling to a recipient vehicle, a second connector configured for coupling to a donor vehicle, and a controller unit for controllably transferring energy between said donor and recipient vehicles. An example charging apparatus can be configured to enable direct current (DC) charging of the recipient vehicle battery by the donor vehicle battery. In an example embodiment, a charging apparatus is embodied as a portable device that can be easily transported, for example it can be stowed at a donor or recipient vehicle. An exemplary charging apparatus can comprise a power conversion module configured to transfer energy between the donor and receiver batteries, and a processor module configured for communication with the donor and recipient vehicles and for controlling energy transfer by the power conversion module. In an example embodiment, a charging apparatus can perform voltage matching between the donor and receiver batteries.

A method for charge transfer can include coupling a charging apparatus with a donor vehicle, coupling a charging apparatus with a recipient vehicle, matching the donor vehicle battery voltage with the recipient vehicle battery voltage, performing a fault detection process, and controllably transferring charge between said donor vehicle battery and said recipient vehicle battery. In an example method, transferring charge between the donor and receiver batteries comprises fast DC charging.

DETAILED DESCRIPTION OF EXAMPLE EMBODIMENTS

As required, example embodiments of the present invention are disclosed. The various embodiments are meant to be non-limiting examples of various ways of implementing the invention and it is understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects.

The specific structural and functional details disclosed herein should not be interpreted as limiting, but merely as a basis for the claims and as a representative basis for teaching one skilled in the art to variously employ the present invention. For example, while the exemplary embodiments are discussed in the context of a vehicle, it will be understood that the present invention need not be limited to that particular arrangement. Furthermore, control functions described as performed by a single module, can in some instances, be distributed among a plurality of modules. In addition, methods having actions described in a particular sequence may be performed in an alternate sequence within the scope of the appended claims.

Today, many electrified vehicles (EVs), such as plug-in electric vehicles (PEVs) and battery electric vehicles (BEVs) plug in to a power grid that provides alternating current (AC) charging sessions that usually last several hours. During a typical session, charging equipment at a vehicle (EV) can cooperate with electric vehicle service equipment (EVSE) at a charging station to coordinate the charge transfer from the grid to the vehicle. As discussed above, there are occasions in which a vehicle configured for AC charging is in need of additional charging options, preferably options associated with shorter charging sessions. The present invention can provide fast DC charging of a recipient vehicle using energy provided by a donor vehicle. In an exemplary embodiment, the invention can transfer charge via a process and interface similar to that employed between an EV and EVSE at a charging station. In an example embodiment, apparatus hardware, software and methods are configured to comply with industry standards pertaining to electrified vehicle charging, such as, but not limited to, Society of Automotive Engineers (SAE) 1772, International Organization for Standardization (ISO) 15118-1, 15118-2, 15118-3, and the German DIN Specification 70121, which are incorporated herein in their entirety by reference.

Figure 1:
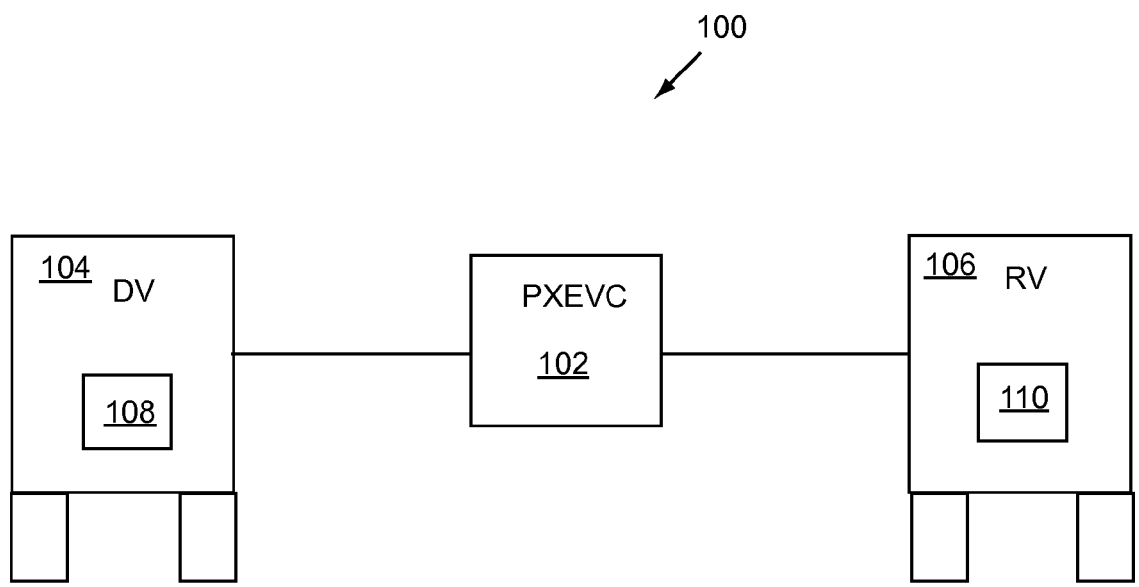
FIG. 1 shows an example system.

FIG. 1 shows an example system 100 in which a Portable Cross Electric Vehicle Charger (PxEVC) 102 can interface with a donor vehicle (DV) 104 and a recipient vehicle (RV) 106 to provide energy from a donor energy storage device (ESD) 108 at the to a recipient ESD 110. For the purposes of this disclosure, a recipient vehicle is that vehicle having an ESD that is to receive additional energy. A donor vehicle is understood to be one having a (donor) ESD that is capable of providing energy. Under this definition, it is understood that a vehicle may be a donor vehicle at one instance in time, and a recipient vehicle in another instance. By way of example, but not limitation, the vehicles 104, 106 are in the form of an electrified vehicle (EV) such as a battery electric vehicle (BEV) that is powered solely by electricity. However, it is contemplated that the invention can also be practiced with hybrid-electric vehicles (HEVs) and plug-in electric vehicles (PEVs).

In an example embodiment, the ESDs 108 and 110 can be in the form of a rechargeable energy storage system (RESS) configured to provide motoring power for an EV. By way of example, but not limitation, the ESDs 108, 110 can be in the form of high voltage traction batteries or battery packs, such as lithium ion batteries. However, it is contemplated that an ESD can also be embodied as a high voltage capacitor or other electrical charge storage device configured to supply motoring power. In an example embodiment, energy can be provided to the recipient ESD 110 via a DC Level 1 or Level 2 charging process.

Figure 2:
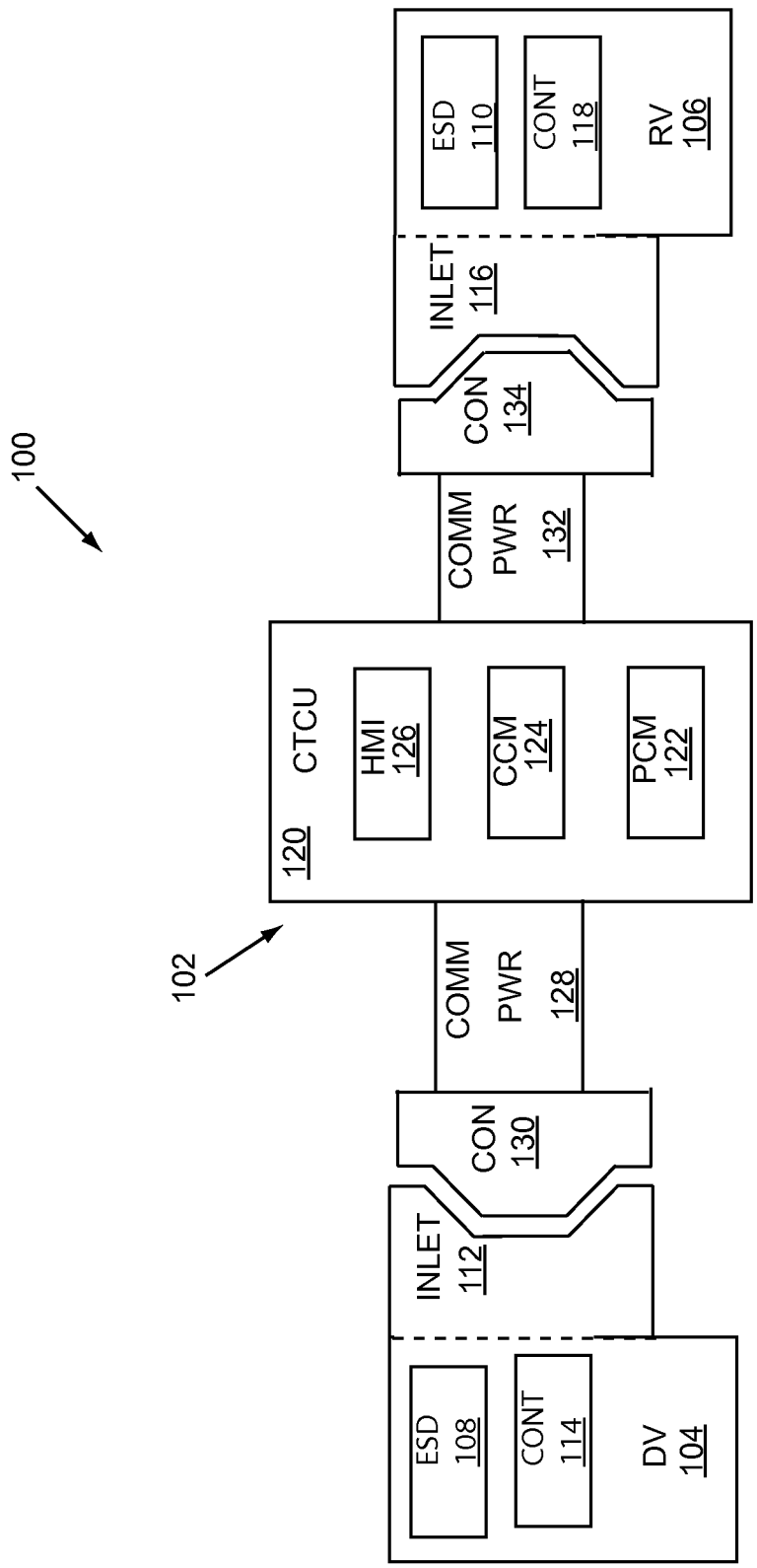
FIG. 2 shows an example system.

FIG. 2 shows an example implementation of the DC charging system 100. In this example, the donor and recipient vehicles 104, 106 can be manufactured in accordance with Society of Automotive Engineers (SAE) standards for electrified automobiles, and as such, can be similarly equipped. By way of example, but not limitation, the PxEVC 102 can engage the charging inlet 112, receive energy from the donor ESD 108, and provide energy to the recipient ESD 110. In an exemplary embodiment, the PxEVC 102 can be configured to cooperate with a control module 114 at the donor vehicle 104 to conduct a charge transfer process. The control module 114 can comprise hardware, software, firmware and/or some combination thereof and be configured to communicate with the PxEVC 102 in compliance with SAE DC charging protocols as well as control aspects of a charge transfer process. In an example embodiment, the control module 114 can comprise a dedicated module configured to authorize and implement a charge donation process, such as, but not limited to, software instructions executable at a microprocessor.

In a similar manner, the PxEVC 102 can be configured to engage a charge inlet 116 at the recipient vehicle 106. The PxEVC 102 can be configured to cooperate with a control module 118 conduct a charge transfer process. Like the control module 114, the control module 118 can comprise hardware, software, firmware, and/or some combination thereof and be configured to enable a DC charging process in compliance with SAE standards. In an example embodiment, the control modules 114, 118 can be configured to perform and coordinate a variety of vehicle-related functions, including those unrelated to the charging process. Alternatively, the control modules 114, 118 can be embodied as modules dedicated to a charging process and configured to cooperate with other vehicle modules as necessary.

By way of example, but not limitation, the PxEVC 102 can include a charge transfer control unit (CTCU) 120, a first cable 128 coupled to a first connector 130, and a second cable 132 coupled to a second connector 134. In an example embodiment, the first and second cables 128, 132 can be in the form of bundled cables configured for transmission of electrical control signals as well as charge current. In an exemplary embodiment, the connectors 130, 134 can be in the form of a standard charging connector configured to interface with a charge inlet port at an electric vehicle. For example, the connectors 130, 134 can be configured to engage charge inlets 112, 116 respectively to electrically couple the CTCU 120 with the ESDs 108, 110. By way of example, the inlets 112, 116 and the connectors 130, 134 can be configured to operate in compliance with SAE J1772 for DC charging of electrified vehicles so that connectors 130, 134 can engage charge inlet ports of all automobiles designed in accordance with the globally recognized standards. As a result, the PxEVC 102 can provide a universal charging device compatible with automobiles of various makes and models. The connectors 130, 134 can be configured to enable electrical connectivity between a plurality of conductors extending from the CTCU 120 within the cables 128, 132 and a plurality of associated conductors at the charge inlets 112, 116.

The example CTCU 120 can comprise a power conversion module (PCM) 122 and a communication and control module (CCM) 124. The PCM 122 can comprise a DC/DC converter circuit configured to receive current from a donor vehicle ESD and provide current to a recipient vehicle ESD. The CCM 124 can comprise hardware, software, firmware and/or some combination thereof. In an example embodiment, the CCM 124 can comprise a microprocessor or other processing device configured to communicate via predetermined protocols, monitor electrical power and connections, perform a fault detection process and control operation of the PCM 122. For example, the CCM 124 can be configured to cooperate and communicate with control modules 114 and 118 at the donor and recipient vehicles 104, 106 in compliance with ISO standards 15118-1, -2, and -3, and/or SAE J1772, pertaining to DC charging of electric vehicles. In an example embodiment, a PxEVC can be configured to perform a voltage-matching process between traction ESDs of donor and recipient vehicles. The exemplary CTCU 120 can further be configured with a user input means to receive input from a user, shown here by a human-machine interface (HMI) module 126. By way of example, the HMI module 126 can be as simple as a power button for user input, or can include other features such as, but not limited to a display screen.

Figure 3:
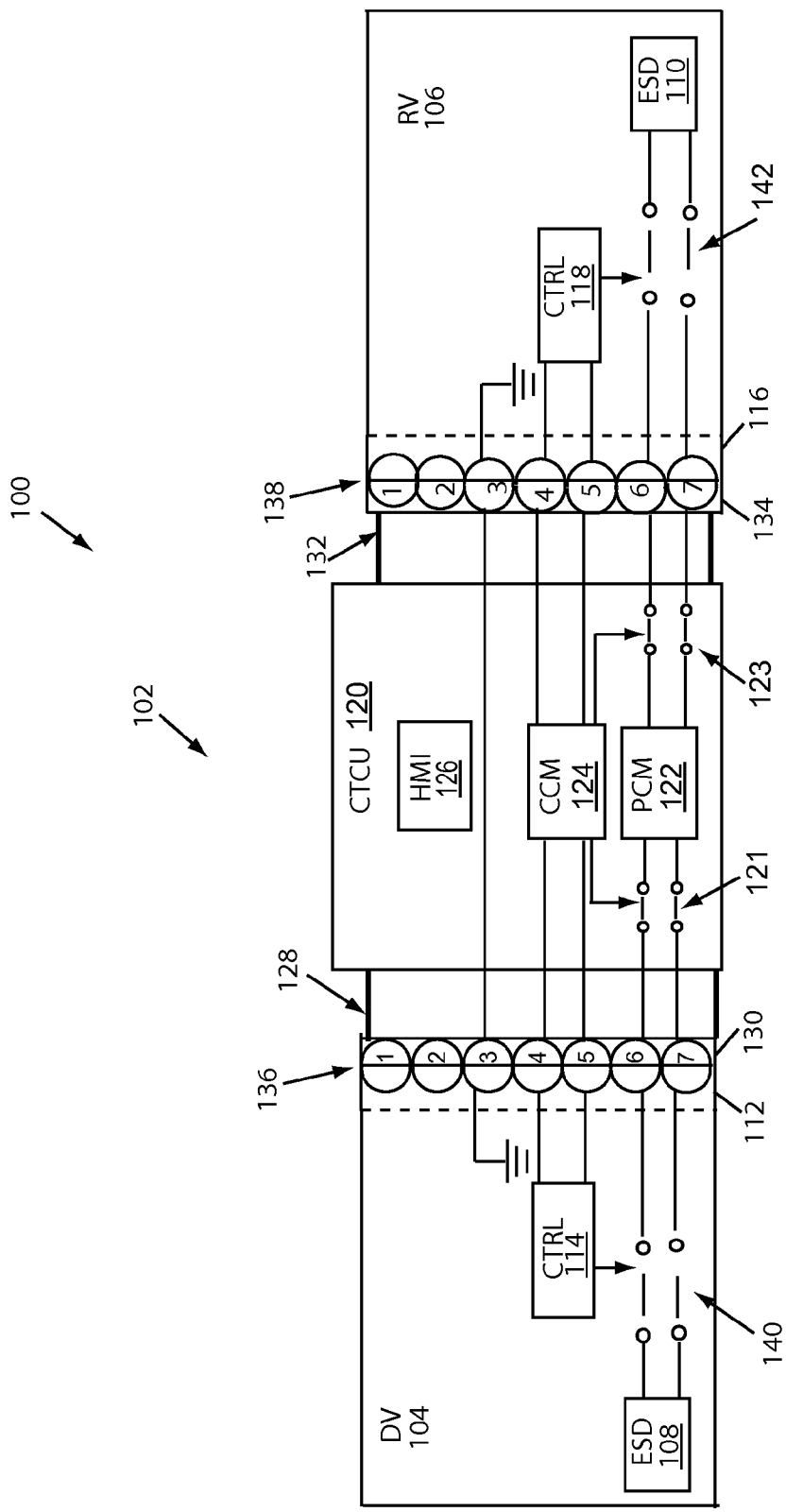
FIG. 3 shows an example system.

Referring to FIG. 3, when engaged, the inlet 112 and connector 130 can form a conductive coupler 136 that mates conductors in one with corresponding conductors in the other. For example, the inlet 112 and the connector 130 can each include a plurality of terminals associated with various conductors as defined by SAE standard J1772. In accordance with the J1772 standard for DC charging, the inlet 112 and connector 130 can include 7 terminals, with, terminals 1 and 2 designated for Level 1 and 2 AC power exchange, terminal 3 designated for a ground connection, and terminals 4 and 5 designated for control signals. By way of example, terminal 4 can be used to conduct control pilot signals, and terminal 5 can be used to conduct proximity detection signals. Terminals 6 and 7 can be used for DC charging, such as but not limited to Levels 1, 2 or 3 DC charging. By way of example, terminals 6 and 7 can electrically couple conductors that can, in cooperation with charging relays 140 and transfer relays 121, connect the CTCU 120 with the ESD 110 for fast Level 2 DC charge transfer.

The charging inlet 116 and the recipient vehicle 106 can have similar configurations to those discussed above for the charging inlet 112 and donor vehicle 104. The connector 134 and the inlet 116 can engage to form a conductive coupler 138 that can include the 7 terminals specified by SAE J1772. In an example embodiment, a pair of charging relays 142 can couple terminals 6 and 7 of the coupler 138 with the ESD 110 for Level 2 DC charge transfer. The PxEVC 102 can include a set of transfer relays 123 for coupling the PCM 122 with the terminals 6 and 7 for Level 2 charge transfer. In an example embodiment, the CCM 124 can be configured to control the opening and closing of the transfer relays 121 and 123.

In the past, an EV has been configured for a charge transfer process in which charge is received, for example, when a vehicle ESD is AC charged by EVSE. During a typical recharge process (see standards referenced above), a recipient vehicle can control the process by requesting a certain voltage and/or current from the EVSE. A PxEVC can be configured to interface with a recipient vehicle in a manner similar to that of an EVSE at a charging station interfacing with a vehicle to be charged. In a method of the invention, however, a donor vehicle provides, rather than receives, electrical charge. Accordingly, in an example method it is contemplated that a donating vehicle can be configured to exert some degree of control over a charging process. For example, the control module 114 can be configured to exercise control over one or more aspects of the charge transfer. By way of example, the control module 114 can be configured to authorize a charge donation process, and, tasked with that function, can be configured to determine whether predetermined conditions, requirements, and/or and charging limitations are satisfied. Thus, the control module 114 can be configured to protect a donor ESD from unauthorized use and over-depletion.

Figure 4:
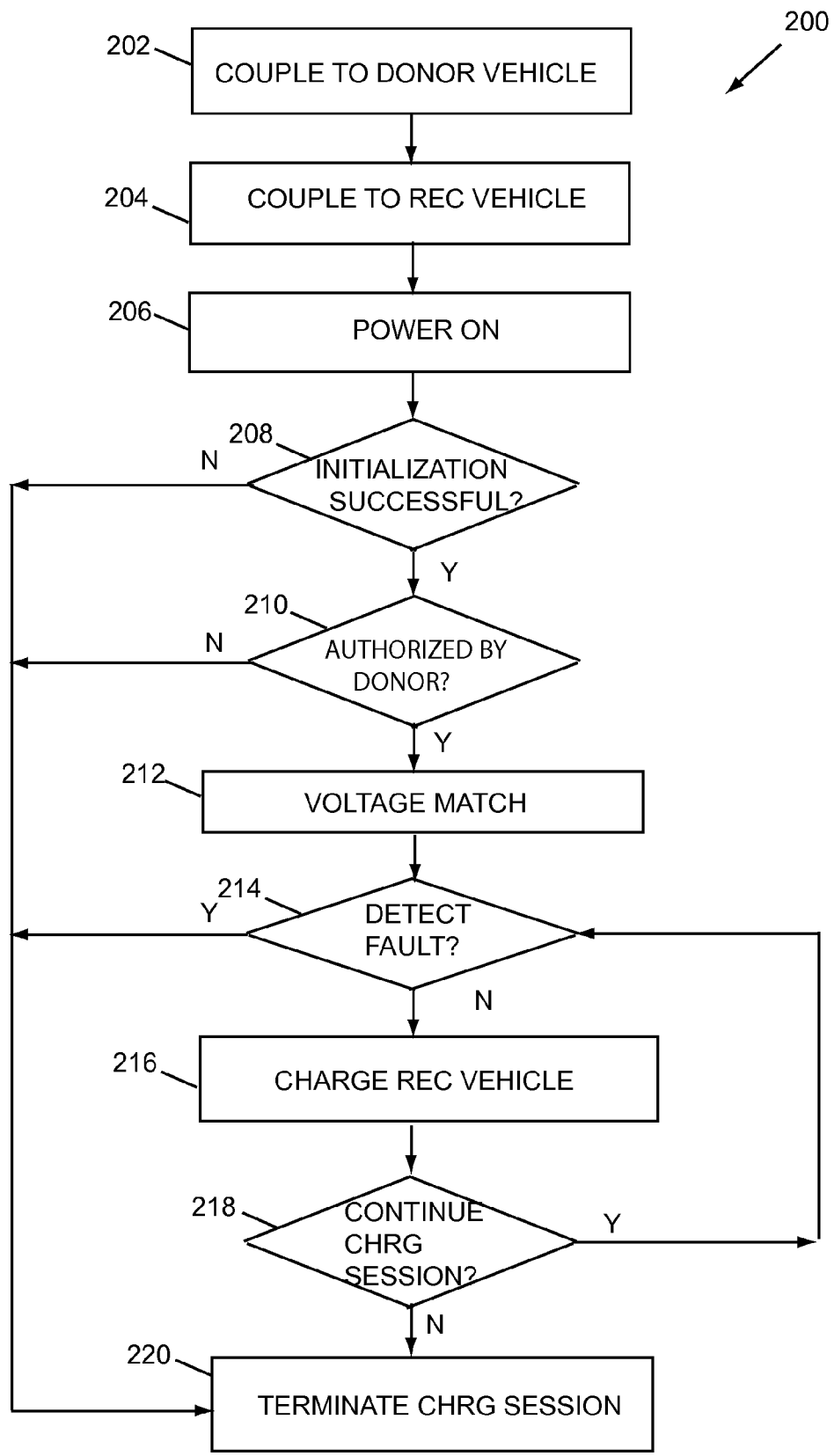
FIG. 4 shows an example method.

In general, a DC charging session can include an initialization stage in which communications and charging parameters are established, a pre-charging stage, a charge transfer stage, and a session termination stage. FIG. 4 shows a flow diagram of an example method 200 that can be practiced at a PxEVC. At block 202 a PxEVC can be coupled to a donor vehicle. For example, the connector 130 of the PxEVC 102 can engage the charge inlet port 112 at the donor vehicle 104. At block 204, a PxEVC can be coupled to a recipient vehicle. By way of example, the connector 134 can be inserted into the charge inlet port 116 at the recipient vehicle 106. In an example embodiment, the PxEVC 102 can interface with the recipient vehicle 106 in a manner similar to that of electric vehicle service equipment interfacing with the recipient vehicle 106 at a charging station.

At block 206 a PxEVC can be powered ON. By way of example, user input can be received at the HMI module 126 to power on the PxEVC 102. For example, a user can depress a power button at the PxEVC 102 to turn it on. By way of further example, a PxEVC can be powered on automatically as a result of being plugged in to one or both charge inlets 112, 116, or as a result of keying on a donor vehicle to which it is coupled. In an example embodiment, the CTCU 120 can include a power supply (not shown), such as a low voltage battery configured to provide power for CTCU 120 operations.

In an example embodiment, at block 208 an initialization process can be performed. By way of example, an initialization process can include establishing communication links with, and receiving and/or exchanging donor and recipient vehicle charging parameters. In an example embodiment, successful coupling of the connectors 130, 134 with the charge inlets 112 and 116 can prompt an initialization process in which the CCM 124 can establish communication with the control modules 114 and 118 and receive charging parameters therefrom. By way of example, charging parameters can include maximum current, maximum voltage, desired current, target voltage, etc. for ESD 108 and ESD 110. Charging Level, i.e. Level 1 or Level 2 DC charging can be determined. Upon successful completion of the initialization process, the method 200 can proceed to block 210. However, if the initialization process is not completed successfully, for example communication links failed to be established, or charging parameters provided by donor and recipient vehicles are incompatible, the method can end at block 220.

At decision block 210 a determination can be made as to whether a charging session is authorized. In an example embodiment, a donor vehicle can exercise some degree of control over the charge process. By way of example, but not limitation, the control module 114 of the donor vehicle 104 can be configured to authorize a charge donation process. In an example method, a PxEVC can be configured to confirm authorization. By way of example, the CTCU 120 can be configured to receive a control signal or data message from the controller 114 that a charging session has been authorized. A fault signal indicating authorization denied, or a failure to receive an affirmative authorization signal, can lead to termination of the method at block 220. In an example embodiment, a PxEVC can be configured to prompt the control module 114 for authorization notification. It is also contemplated that authorization can be confirmed by means other than a control or data message. For example, when a charge donation transfer process is authorized, the controller 114 can close the charging contactors 140 at the donor vehicle 104, which can result in a voltage appearing at the terminals 6 and 7. In an example embodiment, voltage sensing at the PxECU 102 can detect the voltage at the terminals 6 and 7. The CCM 124 can be configured to use the voltage detection as an indication that the donor vehicle 104 has authorized a charge transfer.

At bock 212 a voltage matching process can be performed. In an example embodiment, the PxECU can be configured to first regulate the ESD 108 voltage to the controller 118 requested voltage. In an example embodiment, the CCM 124 can close transfer contactors 121 to allow current flow from the ESD 108 to the PCM 122. In an exemplary method, the PxEVC 102 can establish a predetermined voltage at its output prior to commencing a charge transfer process. For example, if the ESD 110 is embodied as an HV battery configured to provide a voltage of 300V, the PxECU 102 can use energy provided by the donor ESD 108 at negotiated current levels to establish a voltage of around 300-301V, as determined by controller 118 request, at the PCM 122 output. In an example embodiment, the CCM 124 can be configured to close the transfer contactors 123 to provide a voltage to the terminals 6 and 7 of the coupler 138. In an exemplary method, the PxEVC 102 can control output to ramp up voltage to match the voltage request of the controller 118.

At block 214 a determination can be made as to whether a fault has been detected. An example method can include monitoring for a variety of faults at the vehicle and/or at the PxEVC. For example, most vehicles include an onboard diagnostic system designed to detect faults at the vehicle. In an example embodiment, the controllers 114 and 118 can be configured to cooperate with onboard diagnostic systems to be alerted of any faults that could compromise the charging process. Critical faults can result in termination of the method 200 by the PxEVC 102. In an example embodiment, fault signals can be transmitted from a controller module at a vehicle to the CCM 124 at the CTCU 120 via the terminals 4 and 5, which can be used for communication and control signals. In addition, a PxEVC can be configured to detect the presence of a fault, for example, a poor connection between a charge inlet and a connector, a communications link failure, a fault at the CTCU 120, etc. In an exemplary embodiment, a fault detection process similar to that performed when an ESD is DC charged by EVSE at a charging station, such as that described by the J1772 standard can be conducted. By way of example, but not limitation, faults that can lead to termination of the charging process can include loss of safety ground, loss of high voltage isolation, loss of communication, and interruption of power transfer.

When no faults are detected, the method 200 can continue to block 216 at which charge is transferred. The control module 118 at the recipient vehicle 106 can close the charging relays 142 so that current can flow from the ESD 108 through charging relays 140, coupler 136 terminals 6 and 7, transfer relays 121, PCM 122, transfer relays 123 and charging relays 142 to the recipient ESD 110.

In an example embodiment, a PxEVC can be configured for fast DC charging in accordance with Level 1 and Level 2 charging parameters described in the SAE J1772 standard specification. In an example embodiment, a charging current can be higher during bulk charging of the recipient ESD until a predetermined voltage is reached, then the charging process can be completed using a lower current. Voltage and current output at the PxEVC can be controlled by controlling output of a DCDC converter at the PCM 112. By way of example, a PxEVC can be configured to perform DC charging of the recipient ESD with current ranging from zero to 200 amperes and voltage ranging between 200-500V.

At block 218, a determination can be made as to whether a charge process is to continue. It is contemplated that a charging session can be stopped automatically by a PxEVC, a donor or recipient vehicle, or stopped manually by a user. In an example embodiment, the CCM 124 can be configured to receive input from one or more sources regarding a stop charging request. For example, a recipient vehicle can request that a charging session be terminated, when a desired or predetermined SOC has been reached. Accordingly, the CCM 124 can be configured to receive a stop charge request from the controller 118. It is also contemplated that the controller 114 at the donor vehicle can request or command that a charging process be stopped, or indicate that a process is no longer authorized, when the donor ESD 108 SOC reaches or falls below a predetermined threshold or when other predetermined requirements, such as those required for authorization, are no longer satisfied. Thus the CCM 124 can thus be configured to receive input regarding termination from the controller 114. In an example embodiment, a user may also terminate a charge transfer process. Accordingly, a PxEVC can be configured to receive user termination input, via the HMI 126 or other means, such as a means at the donor vehicle 104, which can be communicated to the PxEVC. In addition, it is contemplated that in an example embodiment, a PxEVC can independently terminate a charging process. For example, the CCM 124 can be programmed with instructions that can include charging and termination requirements that may pertain to conditions and/or status at the donor and recipient vehicles and/or the PxEVC itself. Thus, at decision block 218, the determination of whether to continue the charge process can depend on input from a variety of sources. If a determination is made to continue the charging the process, the method 200 can continue at block 214.

A determination that the charging process is to terminate can lead to block 220. In an example embodiment, a termination process can begin with a transition to a shutdown mode. During a shutdown mode the PxEVC and donor and recipient vehicles can be configured to return to a de-energized safe state so that the connectors 130, 134 can be safely disengaged from the inlets 112, 116. The CCM 124 can reduce PxEVC 102 current output to zero. In an example embodiment, charging contactors 140 at the donor vehicle 104 can be opened, as well as transfer relays 121 and 123 at the PxECU, and charging relays 142 at the recipient vehicle 106. When voltage across terminals 6 and 7 of the couplers 136, 138 decreases to a desired level, the connectors 130, 134 can be removed from the charge inlets 112, 116. In an example embodiment, a shutdown follows a normal charging termination sequence as outlined in ISO15118-1,-2 or SAE J1772.

Figure 5:
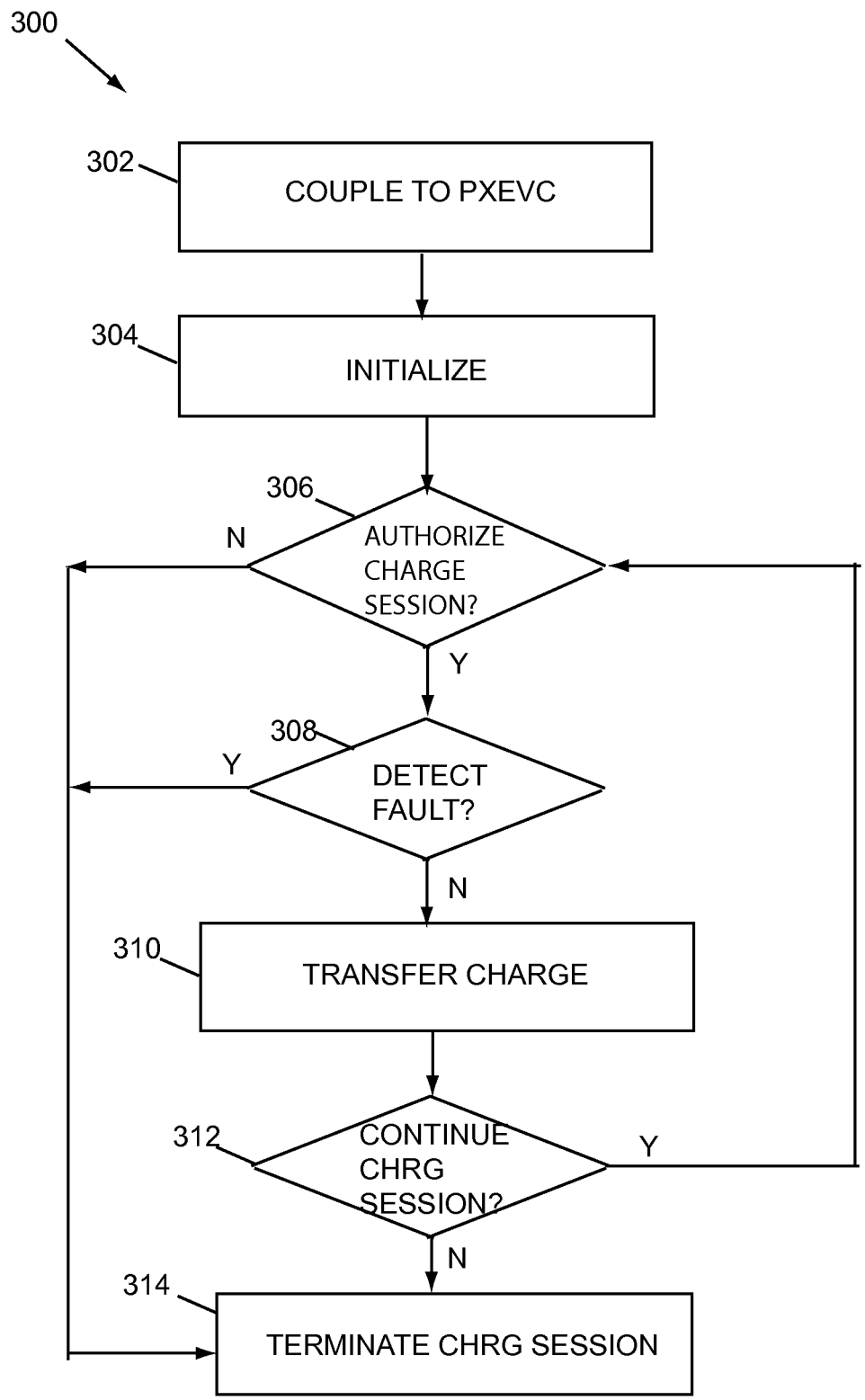
FIG. 5 shows an example method.

FIG. 5 shows an example method 300 that can be practiced at a donor vehicle. At block 302 a donor vehicle can electrically couple a PxEVC. For example, charge inlet 112 can engage the connector 130 of the PxEVC 102. In an example embodiment coupling of the connector 130 and inlet 112 can trigger operation of the control module 114. Alternatively, the control module 114 can be powered on when the vehicle 104 is turned on, either by turning an ignition key, detecting a key in keyless ignition vehicles or depressing a vehicle power button.

At block 304 an initialization process can be performed. As discussed previously herein, an initialization process can include, among other possible actions, the control module 114 establishing communication with the CCM 124 and negotiating charging parameters such as current and voltage levels. As discussed above, failure to successfully complete the initialization process can prompt the CCM 124 to terminate the charge transfer process. In an example embodiment, failure to successfully complete initialization can prevent the control module 114 from continuing a charging process. At decision block 306 a determination can be made as to whether to authorize a charge donation process. In an example method, this determination can include determining whether one or more predetermined charging conditions are satisfied. By way of example, but not limitation, charging conditions can include vehicle 104 operator approval, and a minimum SOC at the ESD 108. In an example embodiment, detection of a vehicle 104 key at the vehicle 104 can satisfy an operator approval requirement. For example, the control module 114 can be configured to cooperate with a vehicle control unit (not shown) at the vehicle 104 configured to detect presence of a key at the vehicle. The SOC of the ESD 108 can be determined by the control module 114 or by a separate vehicle module (not shown) with which the control module 114 is configured to cooperate. In an example embodiment, the control module 114 can be configured to compare the charge or charge surplus at the ESD 108 to a predetermined minimum charge or charge surplus requirement. When predetermined requirements are satisfied, a charge donation transfer process can be authorized by the control module 114. In an example embodiment, the control module 114 can be configured to provide an authorization signal to the PxEVC 102. The control module 114 can also close the charging contactors 140 when the charging process is authorized. As discussed previously herein, contact closure can be detected and interpreted by a PxEVC as confirmation that a charge session is authorized. The method 300 can continue to block 308.

If charging conditions are not satisfied, an override option can allow a user to manually override the predetermined requirements. For example, the controller 114 can be configured to use operator input received at the vehicle 104 to bypass failure of the predetermined requirements and allow authorization of a charge transfer process. It is further contemplated that in an example embodiment, the control module 114 can be configured to perform an override operation under particular circumstances, without relying on user input. If an override option is exercised, charging can be authorized, and the method can continue to decision block 310. However, if the predetermined conditions required for authorization are not satisfied, and no override option is exercised, then the method can terminate at block 314. In an example embodiment, the control module 114 can provide a signal to the CCM 124 indicating that authorization for a charging process is denied.

At decision block 308 a determination can be made as to whether any faults are present. As described earlier herein, the control module 114 can be configured to check for faults at the donor vehicle 104, for instance in cooperation with a vehicle control unit. In addition, it can be configured to receive fault signals from the PxEVC. If a fault has been detected, a charging session can terminate at block 314.

If no faults are detected, the method 300 can continue to block 310 where the donor ESD 108 can transfer charge. In an example embodiment, the control module 114 can be configured to close the charging relays 140 to allow current to flow from the ESD 108 to the PCM 122 of the CTCU 120. By way of example, the control module 114 can close the charging relays 140 in response to a prompt from the PxEVC CCM 124.

The method 300 can continue to decision block 312 at which a determination can be made as to whether a charging session is to continue. In an example embodiment, the controller 114 can be configured to receive input regarding termination of a charging process. For example, a PxEVC can be configured to provide a stop charge session signal to the donor vehicle. Alternatively, a user interface or other means at a donor vehicle can allow operator input commanding that a charge session be stopped. If no termination input is received, the session can continue, and the method 300 can proceed to block 306. At block 306, the controller 114 can use conditions at the donor vehicle to determine whether the charge process should continue to be authorized. As discussed previously herein the controller 114 can determine whether predetermined charging requirements are satisfied, such as a minimum SOC at the ESD 108. Thus, while the controller 114 can authorize the commencement of a charging process based on satisfaction of requirements, it can also discontinue a charge donation process by subsequently denying authorization, or providing a stop charging signal when those requirements are no longer satisfied. In this manner, the method 300 can protect the donor ESD 108 against becoming depleted to the point that its own voltage becomes unacceptably low. In an example embodiment, once a bypass option is exercised, it can remain in effect until a charge session is terminated, obviating the need for a user to repeatedly provide user input to exercise an override option.

If a determination is made at block 312 that a charge session is to no longer continue, at block 314 a charging session can be terminated. The controller 114 can trigger a shutdown mode at the donor vehicle 104 and open the relays 140 to disconnect the ESD 108 from the coupler 136 and the CTCV 120.

Figure 6:
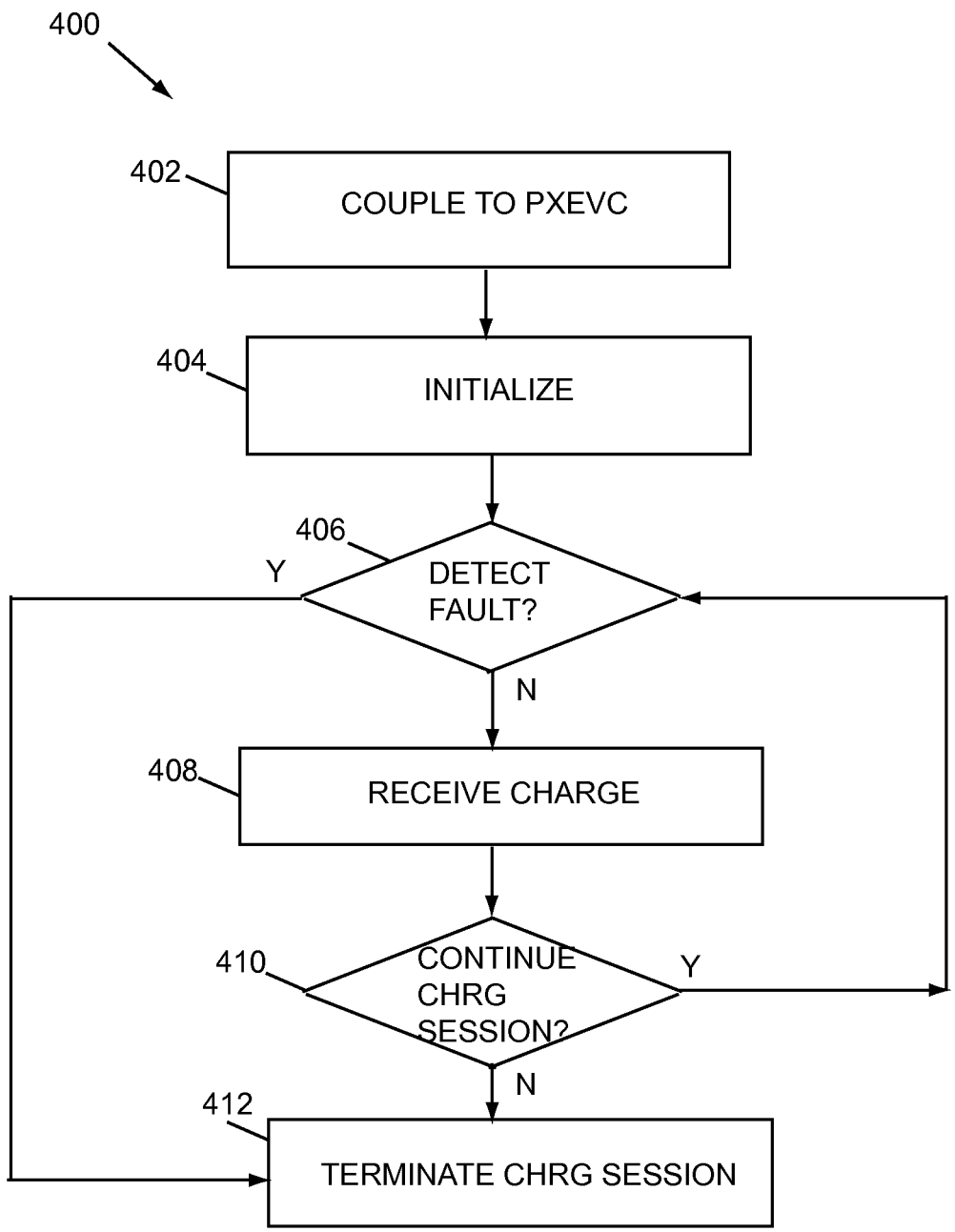
FIG. 6 shows an example method.

FIG. 6 shows a flow diagram of a method 400 that can be practiced at a recipient vehicle. At block 402 a recipient vehicle can couple to a PxEVC. For example, the charge inlet 116 can engage the connector 134. In an example embodiment, successful coupling can result in controller 118 activation. At block 404 the controller 118 can participate in an initialization process that can include establishing communications with the CCM 124 and negotiating charging parameters that can include voltage and current levels, as described in the SAE J1772 specification for DC charging protocols. As described above, a PxEVC can terminate a charging session if an initialization stage cannot be completed successfully. It is further contemplated that an example method can include termination by a donor or recipient vehicle upon failure of the initialization stage. When initialization is successful, the method 400 can continue to decision block 406, where a determination can be made as to whether any faults are detected. For example, a fault detection method similar to that previously described herein as conducted at the donor vehicle 104 can be performed; i.e. fault detection can include checking for faults at the vehicle 106 and at the coupler 138. If a fault is detected, a fault signal can be provided to the PxEVC 102 and the method can end at block 412. If no faults are detected, the example method 400 can continue to block 408 at which electrical charge can be received. In an example method, the ESD 110 can receive charge in accordance with a charging profile that can include a pre-charging period. In an example embodiment, the controller 118 can close the relays 142 to electrically couple the ESD 110 with the PCM 122 to enable the charge transfer. Charge can be transferred at previously negotiated current levels to achieve an intended voltage.

At decision block 410 a determination can be made as to whether the charging session is to continue. In an example embodiment, a recipient vehicle can be configured to stop a charging session. For example, the controller 118 can monitor the state of charge of the ESD 110 and be configured to stop a charging event when a desired SOC is achieved. In an example embodiment, the controller 118 can provide a stop charging signal to the PxEVC 102. However, it is contemplated that a PxEVC or donor vehicle can also terminate a session, in which case the controller 118 can be configured to receive a "stop charging" signal. At block 410, in addition to checking SOC status, an ECU can check whether a stop session signal or other termination input has been received. If the charge session is to continue, the method 400 can proceed to block 406. Otherwise, the charge process can be terminated at block 412. In an example embodiment, the controller 118 can open the relays 142 during a shutdown mode that terminates the method 400. In an exemplary embodiment, a PxEVC 102 can coordinate the termination process at donor and recipient vehicles. Termination can be performed in a safe manner so that voltages at the couplers 136, 138 are reduced to zero or minimal levels prior to disengagement of the connectors 130, 134 from the charge inlets 112, 116.

The present invention provides apparatus and methods that can be used to charge an electric vehicle high voltage battery using a donor vehicle high voltage battery. In an exemplary embodiment, a PxEVC can facilitate efficient fast DC charging that includes voltage matching and transferring charge at current levels acceptable to both donor and recipient vehicles. In an example embodiment, an automobile service vehicle can be equipped with a PxEVC to use in conjunction with a service vehicle donor battery in response to calls from stranded motorists. By way of further example, consumer vehicles can be configured to cooperate with a PxEVC to transfer charge so that a motorist having a PxEVC can provide or receive charge from another motorist, obviating the need to contact a roadside assistance service. A PxEVC can provide a portable, stowable recharging means that can be stored at a vehicle for ready access. The invention can provide security and peace of mind to operators of electrified vehicles, ameliorating anxiety about running out of battery power in an area without an accessible charging station. Equipped with a PxEVC, an operator can arrange to recharge an HV battery regardless of vehicle location. Planning for road trips can become much simpler with the assurance that recharging stops can be planned with another driver in advance at convenient locations, no more need to navigate to a specific recharging station location. Should a battery charge be depleted faster than anticipated due to unforeseen dynamic driving conditions, a driver can make arrangements in real time to meet someone at a safe location along his current route, reducing driver stress and improving driver safety.

In an example embodiment, a PxEVC charging interface can be similar to a charging interface at a typical public charging station. Communication and charging protocols described in universal standards discussed herein can be employed so that vehicles of various makes and models can enjoy the benefits offered by a PxEVC, regardless of traction battery chemistry. A PxEVC can monitor faults to provide a safe and effective charge transfer process. A PxEVC can be configured to implement one or more control algorithms to protect a donor ESD from over discharge. By requiring a donor vehicle authorization for an energy transfer process, a PxEVC can thwart energy theft attempts. A PxEVC can be configured to perform a voltage matching process prior to transferring energy between donor and recipient vehicles and implement a precharging stage at low current levels that can protect recipient ESD contactors. By providing a simple, efficient and convenient means for recharging a HV battery, a PxEVC can reduce operator anxiety and increase overall satisfaction with electrified vehicles.

As required, illustrative embodiments have been disclosed herein, however the invention is not limited to the described embodiments. As will be appreciated by those skilled in the art, aspects of the invention can be variously embodied, for example, modules and programs described herein can be combined, rearranged and variously configured. Methods are not limited to the particular sequence described herein and may add, delete or combine various steps or operations. The invention encompasses all systems, apparatus and methods within the scope of the appended claims.

What is claimed:

1. A system, comprising:
   a donor energy storage device (ESD) at a donor electric vehicle;
   a recipient ESD at a receiving electric vehicle; and
   a self-contained portable cross electric vehicle charger (PxEVC) configured to releasably couple a first charging interface at said donor electric vehicle and releasably couple a second charging interface at said receiving electric vehicle, said PxEVC configured to controllably transfer power from said donor ESD to said receiving ESD.

2. The system of claim 1, wherein said PxEVC is configured to to match an output voltage at said PxEVC to a requested recipient ESD voltage prior to transferring power from said donor ESD to said recipient ESD.

3. The system of claim 1, wherein said PxEVC comprises a power conversion module configured for DC/DC power conversion.

4. The system of claim 1, wherein said PxEVC comprises a processing module configured for communication with said donor and recipient vehicles.

5. The system of claim 1, wherein said PxEVC is configured to detect a fault.

6. The system of claim 1, wherein said PxEVC is configured for fast DC charging of said recipient ESD.

7. A stand-alone charging apparatus for an electrified vehicle, comprising:
   a charge transfer control unit (CTCU) configured to transfer energy between a donor electric vehicle and a recipient electric vehicle;
   a first cable coupled to said CTCU and terminating with a first connector configured for releasably coupling a first charge interface at said donor vehicle;
   a second cable coupled to said CTCU and terminating with a second connector configured for releasably coupling a second charge interface at said recipient vehicle; and
   wherein said apparatus is configured to controllably charge a recipient energy storage device (ESD) of said recipient vehicle using energy from a donor ESD of said donor vehicle.

8. The apparatus of claim 7, wherein said apparatus is configured to enable DC charging of said recipient vehicle ESD with current ranging between zero and two hundred amperes.

9. The apparatus of claim 7, wherein said apparatus is configured to enable DC charging of said receiving vehicle ESD with voltage ranging between 200 and 500 volts.

10. The apparatus of claim 7, wherein said CTCU comprises a power conversion module having a DC/DC converter and configured to transfer energy between said donor and recipient ESDs.

11. The apparatus of claim 7, wherein said CTCU comprises a processing module configured for controlling said power conversion module.

12. The apparatus of claim 7, wherein said CTCU comprises a processing module configured for communication with said donor and recipient vehicles.

13. The apparatus of claim 7, wherein said CTCU comprises a human machine interface (HMI) configured to receive operator input.

14. The apparatus of claim 7, wherein said CTCU is configured to provide an output voltage at said power conversion module that matches a requested recipient ESD voltage prior to charging said recipient ESD.

15. The apparatus of claim 7, wherein said apparatus is portable.

16. The apparatus of claim 7, wherein said apparatus is configured to provide DC power to said recipient vehicle ESD.

17. A method, comprising:
- a first cable of a stand-alone portable cross electric vehicle charger (PxEVC) coupling a first charge interface at a donor vehicle;
- a second cable of said PxEVC coupling a second charge interface at a recipient vehicle;
- said PxEVC detecting presence or absence of a fault; and
- said PxEVC controllably DC charging said recipient vehicle energy storage device (ESD) using said donor vehicle ESD.

18. The method of claim 17, further comprising said PxEVC establishing a communication link with said donor vehicle and with said recipient vehicle.

19. The method of claim 17, further comprising said PxEVC providing an output voltage that matches a requested recipient vehicle ESD voltage.

20. The method of claim 17, further comprising said PxEVC confirming said donor vehicle authorization for said charging.

* * * * *